Feb. 17, 1931. H. C. HEILOS 1,792,906

VALVE

Filed Aug. 16, 1927

INVENTOR
Henry C. Heilos
BY Charles G. Hensley
ATTORNEY

Patented Feb. 17, 1931

1,792,906

UNITED STATES PATENT OFFICE

HENRY C. HEILOS, OF BROOKLYN, NEW YORK

VALVE

Application filed August 16, 1927. Serial No. 213,256.

My invention relates to a valve which may, if desired, be used as a faucet. The object of the invention is to provide a valve for controlling the flow or discharge of fluids and it belongs to that class of valve wherein more than one fluid is controlled in order to deliver a mixture of various proportions of the several fluids. The device is useful in controlling the flow of hot and cold water in bath tubs and for shower baths, although the device is not limited to such uses. It may be used to control the flow of fluids other than liquids, such as oxygen and acetylene for torches and such like. The principal object of the invention is to provide a valve by means of which a plurality of fluids may be controlled in such manner that various mixtures of the several fluids may be obtained. For instance, when used for controlling water for bath tubs or showers, it is possible to obtain the necessary regulation of the hot and cold waters to obtain a mixture thereof having any degree of temperature within the limits of the liquids which are combined.

I am aware that valves have heretofore been proposed for regulating the combined flow of two liquids but so far as I am aware in all previous devices only one fluid or liquid could be reduced in flow at a time. In such devices, therefore, if the valve or faucet were set to give a maximum flow of both liquids and if then it were turned to reduce the flow of one of the liquids the other liquid would continue to flow at the full or maximum rate. The only proportions or mixtures possible, therefore, were those which could be obtained by a gradual reduction in the flow of one of them.

In the present device a finer graduation of the proportions of the two fluids or liquids may be obtained because both liquids can be simultaneously reduced but one more than the other, to alter the proportions.

Another object of my invention is to provide a valve for controlling the flow of liquids in which valve the parts have a tapering fit and a spring maintains the parts in condition to prevent leakage. Other features and advantages will be apparent in the following detailed description of one embodiment of my invention.

In the drawing forming part of this application,

Figure 1:
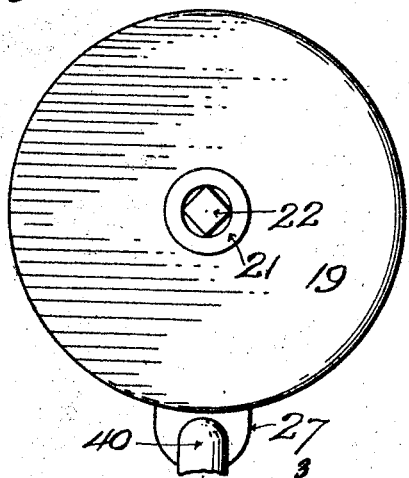
Figure 1 is a plan view of my improved valve.
Figure 3:
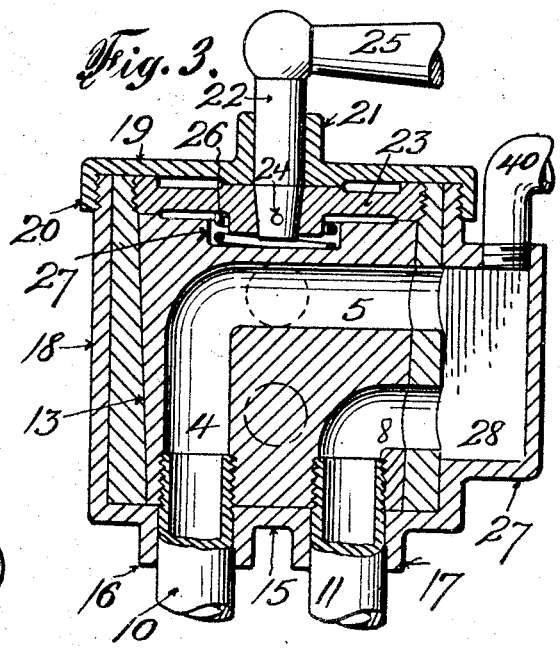
Figure 3 is a sectional view taken on the line 3—3 of Figure 2.
Figure 2:
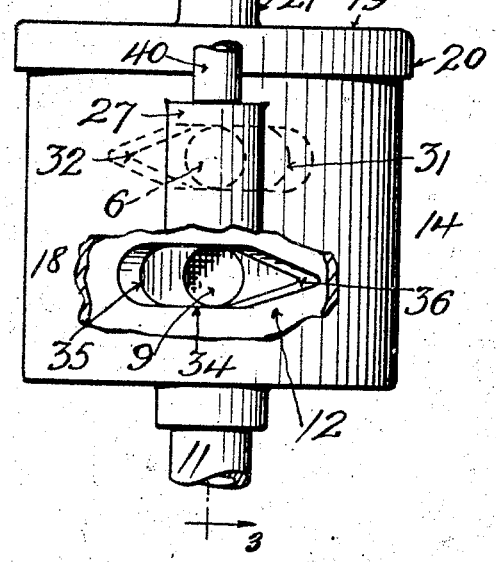
Figure 2 is an elevation thereof with parts broken away to show the interior.

The valve comprises principally two members arranged one within the other and relatively revolvable, and preferably also, a casing enclosing the first mentioned member. In the preferred construction the innermost member of the valve is stationary and the one surrounding it is movable although under the broader aspect of my invention this relationship is not imperative.

In the drawing I have shown an inner valve member comprising a body 1 of circular shape and having flat ends; and this body is preferably not exactly cylindrical but is slightly tapered. I have shown it as slightly greater in diameter at the end 2 and gradually reduced in diameter toward the end 3 so that the shape of this body is frustro-conical.

The member or body 1 is provided with a port 4 extending lengthwise thereof from the bottom end 3 upwardly but not the full length of this member; and this port merges with another port 5 which extends from its point of juncture with the port 4 to the side face of the member 1, forming an outward opening or port 6 at the latter point.

There are other ports in the body 1, preferably, though not necessarily, in a similar plane to the ports 4, 5. The port 7 extends from the end 3 of the body 1 and merges with another port 8 extending at right angles thereto. The latter port opens at 9 on the face of the member 1. If the member 1 is to be the stationary member of the valve, as in the preferred embodiment, then the pipes 10 and 11 from which the fluids are to be fed to the valve, are threaded into the threaded end of the port 4 and into the threaded end of the port 7 respectively. These pipes, therefore, supply the liquids to be measured or proportioned, to the ports 4, 7, so that these liquids or fluids will pass to the outlets 6, 9, on the side face of the body 1.

There is an outer member or sleeve 12 which fits over the member 1 and it has a tapered bore 13 to receive the member 1, the taper of the bore 13 corresponding with the taper of the exterior of the latter member. This sleeve member 12 cooperates with the member 1 to control the flow of fluids and it has certain parts as will be more fully described hereinafter.

The members 1 and 12, are preferably enclosed in a casing or shell 14 having a bottom wall 15 provided with bosses 16, 17, to receive the feed pipes 10, 11, and a vertical, cylindrical wall 18 to enclose the members 1 and 12. There is a top or cover 19 for the member 14 which has a flange 20 threaded onto the upper end of this member. The cover 19 is also provided with a boss 21 having a central aperture through which the stem 22 passes.

There is a top or cap member 23 lying inside the casing 14 and this is threaded, as shown, into the upper end of the sleeve 12 so that the member 23 may be turned to revolve the sleeve. The spindle 22 is attached at one end, as by a pin 24 to the cap 23, so that the spindle 22, cap 23 and sleeve 12 all move together. The spindle projects upwardly, passes through the aperture of the boss 21 to the exterior of the casing and on its outer end it is provided with a handle 25 by means of which the valve is opened, closed and regulated.

I have shown a coiled spring 26 placed in a socket 27 and pressing between the cap 23 and the member 1 to exert a slight pressure on the body 1 and sleeve 12 in opposite directions in order to keep these members in close fit and to take up any play caused by wear.

The casing 14 is shown as formed with a projection or offset 27 forming a mixing chamber 28 extending across the face of the sleeve 12 and in position where the discharge ports of the valve can both discharge their fluids.

The sleeve 12 is provided with ports which cooperate with the outlets of the body 1 in such manner as to permit the regulation and proportioning of the two fluids. These ports are shown similar in shape but reversely arranged. The port 29 has a straight or uniform portion 30 of sufficient length to uncover or open the port 6 to the full extent when registering therewith. One end of the port 29 is shown as semi-circular at 31. The other end of this port is tapered as shown at 32.

Figure 4:
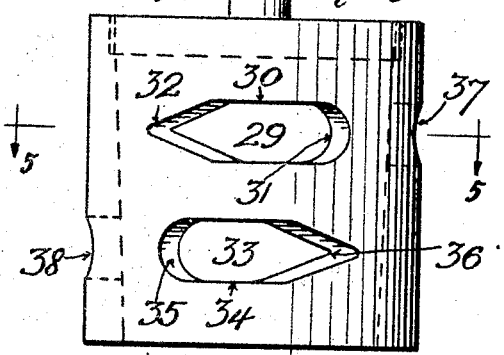
Figure 4 is an elevation of the revolvable sleeve member of the valve.
Figure 6:
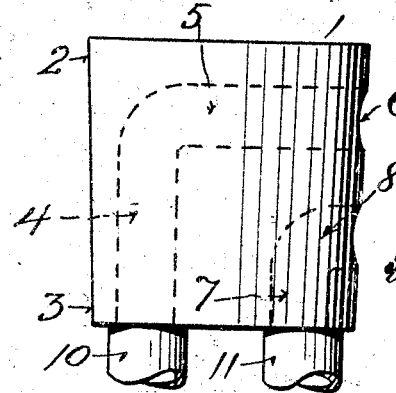
Figure 6 is an elevation of the inner member of the valve.
Figure 5:
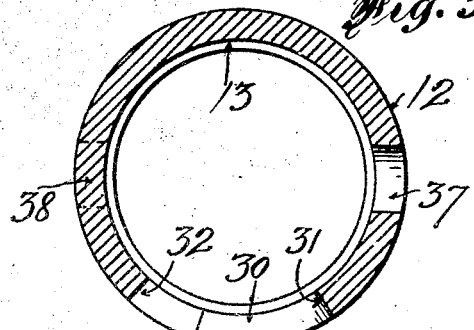
Figure 5 is a sectional view taken on the line 5—5 of Figure 4.

The port 33 is similar to the port 29 only it is disposed where it will cooperate with the outlet port 9 of the body 1. This port 33 also has a straight portion 34 which may register with the outlet port 9 to fully open the latter. This port also has a rounded or half circular end 35 corresponding with the portion 31 of the port 29; and it has the tapered end 36 corresponding with the tapered end 32 of the former port. The ports 29, 33 are reversely positioned; that is, the tapered end of the port 29 is at the left hand end in Figure 4 whereas the tapered end of the port 33 is at the right hand end in this figure.

Preferably, though not necessarily, a single port 37 is provided in the sleeve 12 to register with the outlet port 6 when one fluid only is to be discharged; and a similar port 38 is provided in the sleeve but at a different point and this may be made to register with the port 9 when the port 6 is entirely closed, when the other fluid, only, is to be discharged.

*Operation.*—If only one fluid is to be discharged, say that from the pipe 10, then the handle 25 is turned, rotating the sleeve 12 on the body 1, until the port 37 registers with the port 6. The fluid from the pipe 10 will then flow through the port 4 and the port 5 in the body 1 and thence through the port 37 in the sleeve and into the collecting chamber 28. From there it will discharge through the pipe or nozzle 40 to wherever it is to be used. This causes a flow of the liquid from the pipe 10 only, since the port 9 is closed under the conditions described. If the handle is turned until the port 38 registers with the port 9, then only the fluid from the pipe 11 will discharge. This will flow through the ports 7 and 8 in the body 1, thence through the port 38 in the sleeve and into the collecting chamber 28.

Neither of the above operations differs from any double control valve.

If it is desired to discharge both fluids and to regulate their proportions the steps will be as follows: Let us assume that in the mixture of the two fluids there is required a larger proportion from the pipe 10 than from the pipe 11. Then the handle 25 will be turned until the ports 29 and 33 partly register with the ports 6, 9. Let us say that to start, the rounded portion 31 of the port 29 but slightly registers with the port 6 then, at that time, the part 36 of the port 33 will only slightly register with the port 9. If the handle 25 and with it the sleeve, is turned slightly in one direction the port 29 will open more fully the port 6 and the port 33 will open more fully the port 9, but the effect on the port 6 will be greater than the effect on the port 9 and therefore more fluid will be gradually admitted from the pipe 10 into the mixing chamber 28 than that from the port 9. This difference in flow is due to the difference between the shape of the end 31 of the port 29 which registers with the port 6 and the shape of the end 36 of the port 33 which registers with the port 9. If the sleeve is turned in the reverse direction to that just described then the flow from both pipes 10, 11, will be decreased but the decrease from the pipe 10 will be greater than from the pipe 11 due to the portions 31, 36 of the ports acting differently, though simultaneously, on the ports 6 and 9.

If the sleeve 12 is turned until the straight portions 30 and 34 of the ports 29 and 33 register fully with the ports 6 and 9 then there will be a full flow from both pipes 10 and 11 into the mixing chamber 28.

If desired, the sleeve may be turned until the portion 32 registers with the port 6 and the part 35 registers with the port 9. Then if the sleeve is turned slightly in one direction the flow from the pipes 10, 11 will be increased and if the sleeve is moved slightly in the reverse direction the flow will be decreased. But now the flow from the pipe 11 will be increased and decreased at a greater rate than that from the pipe 10 because conditions have been reversed over that first described. That is to say, the part 32 now has the same effect on the port 6 that the part 36 formerly had on the port 9; and the part 31 has the effect on the port 6 which the part 35 formerly had on the port 9.

It will be apparent from the above that the sleeve may be operated to increase or decrease the flow from both pipes 10, 11 simultaneously and to have the flow from the pipe 10 increase or decrease at a greater rate than that from the pipe 11. Or, conversely, the increase and decrease from the pipe 11 may be at a greater rate than that from the pipe 10. As a result almost any degree of mixture or proportion of the two fluids may be obtained.

Having described my invention what I claim is:

In a valve the combination of two relatively movable valve members, means for admitting fluids from separate sources into said valve, and means for discharging the fluids so that the fluids from said sources are mingled, one of said relatively movable members having a plurality of ports communicating with the fluid sources, the other of said relatively movable members having a plurality of ports co-operating with said first mentioned ports, one port of said second mentioned relatively movable member having differently shaped terminal portions at each end thereof, the second port in said second mentioned relatively movable member having terminals of the same shape as said first port, but arranged in opposite relation to the differently shaped terminals of the first port whereby the flow of fluid from one of said sources of supply will be decreased and increased at a different rate than the flow from the other source.

Signed at the city, county and State of New York, this 10th day of August, 1927.

HENRY C. HEILOS.